(12) United States Patent (10) Patent No.: US 7,606,768 B2
Graubart et al. (45) Date of Patent: Oct. 20, 2009

(54) VOICE SIGNATURE WITH STRONG BINDING

(75) Inventors: Richard Graubart, Andover, MA (US); Beth Abramowitz, Lexington, MA (US)

(73) Assignee: The MITRE Corporation, McLean, VA (US)

( * ) Notice: Subject to any disclaimer, the term of this patent is extended or adjusted under 35 U.S.C. 154(b) by 357 days.

(21) Appl. No.: 10/347,109

(22) Filed: Jan. 17, 2003

(65) Prior Publication Data
US 2004/0143556 A1 Jul. 22, 2004

(51) Int. Cl.
*G06F 21/00* (2006.01)
(52) U.S. Cl. .......................... 705/51; 713/186
(58) Field of Classification Search ............... 713/186; 705/76
See application file for complete search history.

(56) References Cited

U.S. PATENT DOCUMENTS

| | | | |
|---|---|---|---|
| 5,448,641 A * | 9/1995 | Pintsov et al. ................. | 380/51 |
| 5,606,609 A | 2/1997 | Houser et al. .................. | 380/4 |
| 6,064,751 A | 5/2000 | Smithies et al. ............. | 382/115 |
| 6,091,835 A | 7/2000 | Smithies et al. ............. | 382/115 |
| 6,404,859 B1 * | 6/2002 | Hasan ..................... | 379/88.04 |
| 2003/0135740 A1 * | 7/2003 | Talmor et al. ................ | 713/186 |
| 2004/0102959 A1 * | 5/2004 | Estrin ............................ | 704/8 |

FOREIGN PATENT DOCUMENTS

| | | |
|---|---|---|
| WO | WO 01/63386 | 8/2001 |
| WO | WO 01/86386 | 11/2001 |
| WO | WO 02/23796 | 3/2002 |
| WO | WO 03/009217 | 1/2003 |

OTHER PUBLICATIONS

Branchaud, Marc., "A Survery of Public-Key Infrastructures", Thesis McGill University, URL:http://cnscenter.future.co.kr/resource, 1997.
Communication Intelligence Corporation: "Understanding Electronic Signatures", URL:http://web.archive.org/web/20020817162, 2002.

* cited by examiner

*Primary Examiner*—Evens J. Augustin
*Assistant Examiner*—Nancy T Le
(74) *Attorney, Agent, or Firm*—Sterne, Kessler, Goldstein & Fox P.L.L.C.

(57) ABSTRACT

Voice signature method. The signer obtains a public key from an intended recipient of a document to be electronically signed. The signer speaks a personal identification number (PIN) to generate a voice PIN and the signer also speaks at least the signer's name. The voice PIN and voice signature are appended to the document and the voice PIN is encrypted using the public key to create an encrypted voice PIN. A polynomial hash is generated based on the document, the voice signature and the encrypted voice PIN and this hash is itself encrypted based on the PIN to generate an encrypted hash. Finally, the document, the voice signature, the encrypted voice PIN and the encrypted hash are sent to the intended recipient.

11 Claims, 2 Drawing Sheets

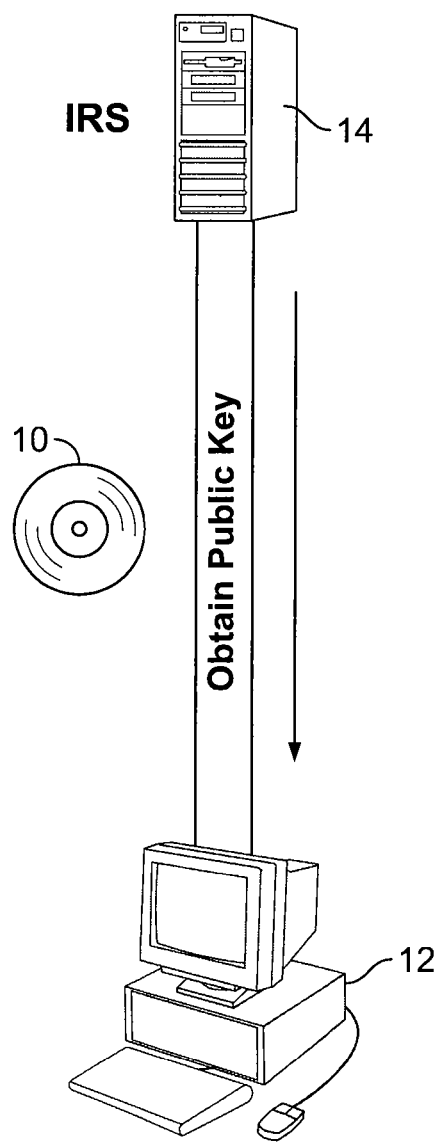
FIG. 1
Tax Form
Name:
SS#:
Gross Income:
FIG. 2
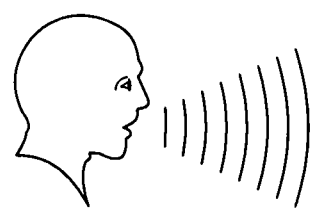
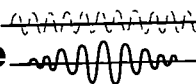
FIG. 3

VOICE SIGNATURE WITH STRONG BINDING

This invention relates to electronically signing documents and more particularly to electronically signing using the signer's voice. The government has rights in this invention as a result of IRS Contract No. TIRNO-99-D-0005.

BACKGROUND OF THE INVENTION

One of the major problems with electronic commerce such as over the Internet is that there is currently no way to sign electronically a document which is comparable in security, strength, ease of use, and user preparation to the traditional handwritten signature on a paper document. An effective electronic signature involves three components. First, there must be effective binding of the signature to the individual (signer). Second, there must be effective binding of the signature to the document. Finally, there has to be some way of ensuring that the signature is in some way unique so that it cannot be copied and employed by other parties attempting to pretend to be the signer. This aspect is referred to as "resistance to replay."

The most common form of electronic signing involves appending a personal identification number (PIN) to a document. This approach is effective only if the PIN is known only to the signer and the receiver and some mechanism is employed to prevent or detect interception of the PIN. Depending upon the implementation, this approach may or may not indicate whether the document has been altered since "signing." The existing state of the art for electronic signing employs public key infrastructure (PKI). In PKI, a polynomial-based hash of the document to be signed is generated. The hash is then encrypted based on the signer's private key. The signed document is sent to the receiver, who uses the signer's public key to decrypt the hash and then revalidate the hash. Successful revalidation indicates that the document has not changed since signing. This approach assumes that the signer protects his/her private key so that anything encrypted by the private key is assumed to be signed by him or her.

The PKI technique has disadvantages, however. For PKI to work, an infrastructure must be in place to generate and distribute a public/private key pair to every signer. This infrastructure is costly to set-up and maintain. The key pair has to be securely distributed to the signer in advance of signing. To clearly and uniquely associate the signer with the key pair, this distribution is usually done through some face-to-face process. In addition, the signer must ensure that the private key is not ever in the possession of any third party.

It is therefore desirable to have an electronic signature system that creates a signature that is strongly bound to the user and strongly bound to the document but not requiring the issuance of private/public keys to each signer.

SUMMARY OF THE INVENTION

The voice signature method according to the invention allows a signer to electronically sign a document. The method includes the signer obtaining a public key from an intended recipient of the document to be electronically signed. The signer speaks a personal identification number (PIN) provided by the software to generate a voice PIN. The signer then speaks at least the signer's name to generate a voice signature. The voice PIN and voice signature are then appended to the document and the voice PIN is encrypted using the public key to create an encrypted voice PIN. A polynomial hash based on the document, the voice signature and the encrypted voice PIN is generated, and this hash is encrypted based on the PIN to generate an encrypted hash. Finally, the document, the voice signature, the encrypted voice PIN and the encrypted hash are sent to the intended recipient.

In a preferred embodiment, the signer speaks temporal information such as date and time in addition to the signer's name. The signer may also speak information included in the document. The public key and PIN may be provided by software or the public key may be downloaded from the intended recipient by the signer. The present method may be used with documents such as, for example, tax forms, purchase agreements, licensing agreements and other commercial agreements. A particularly preferred application is with respect to electronic tax filings.

The present invention capitalizes on the use of asymmetric encryption for binding a signature to a document (use of an encrypted hash) without requiring that each signer have his or her own private key. The binding of the signature to the document is strong, just as in traditional PKI. However, in PKI, the signature and the binding are done by the same mechanism: the private key encrypted hash. As noted above, such private key must be securely distributed to the signer in advance of signing, and the signer must ensure that the private key is not ever in the possession of any third party.

Because the present invention utilizes a combination of public key encryption, symmetric key encryption, and voice recognition and verification technology, the inventors are able to verify that once a signature has been bound to a document neither the document nor the signature can be modified without detection. Unlike prior art PKI methods, under the present invention the means of signing and the means of binding the signature to the document are separate items. Because the signature is biometrically based the effort required to protect the signature from theft is greatly reduced. Moreover, the procedure is carried out without requiring any prior registration or a deployment of significant back-end infrastructure (no need for the signer to possess a private key).

BRIEF DESCRIPTION OF THE DRAWINGS

FIG. 1 is a schematic illustration of communicating computers.

FIG. 2 is a schematic representation of a tax form.

FIG. 3 is a schematic illustration of a taxpayer providing a voice signature.

DESCRIPTION OF THE PREFERRED EMBODIMENT

As stated above, the present voice signature procedure is applicable to any documents that need to be signed electronically. By way of example only, the present invention will be described in detail with respect to the signing of a tax form, in particular, a federal tax form. A taxpayer loads tax preparation software residing on a CD 10 into the taxpayer's computer 12. The CD 10 may include a public key used by the Internal Revenue Service (IRS), or alternatively the taxpayer computer 12 can connect to an IRS computer 14 to obtain the IRS public key.

FIG. 2 shows a stylized tax form that the taxpayer will fill out by entering the required tax information, including, for example, the taxpayer's gross income. If the taxpayer is retrieving the IRS public key from the IRS server 14, this public key must be obtained before attempting to sign the tax form.

After the taxpayer has completely filled out the tax form, the tax preparation software asks the taxpayer to speak a software-specified random or pseudo-random PIN. The taxpayer is then prompted to speak his/her name, date (possibly time) and tax due. It is noted that the software may ask the taxpayer to speak his/her name, date and tax due first and then speak the software-specified PIN. It is preferred that the taxpayer speak the PIN first because digits are more easily recognized to assure the quality of a resulting voiceprint.

The spoken information as illustrated in FIG. 3 acts as a signature and the action of speaking the date and the tax due will serve to indicate taxpayer intent to execute the document. Optionally, the software may prompt the signer to state a specific intent to execute the document. To ensure that the taxpayer has spoken the correct PIN (and that it is understandable) voice recognition software may validate the PIN. The tax preparation software will retain the PIN until the signature process is complete.

Figure 4:
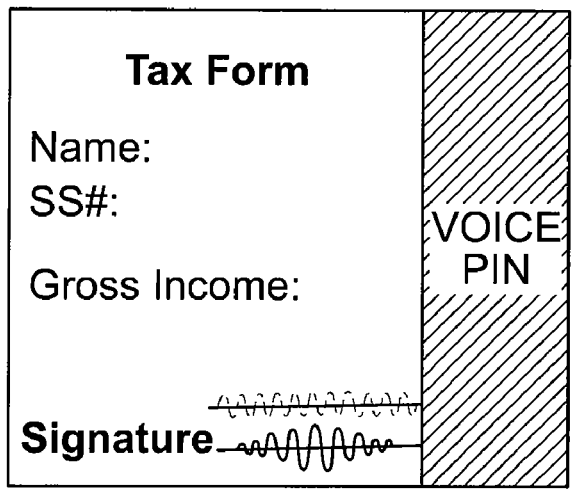
FIG. 4 is a schematic illustration of encryption of a voice PIN.

At this point, the tax preparation software will employ the IRS public key to encrypt the voice PIN. Since the voice PIN is encrypted via a public key, only the IRS, which possesses the private key associated with the public key, can decrypt the voice PIN. The encryption of the voice PIN via the IRS public key is illustrated in FIG. 4.

Figure 5:
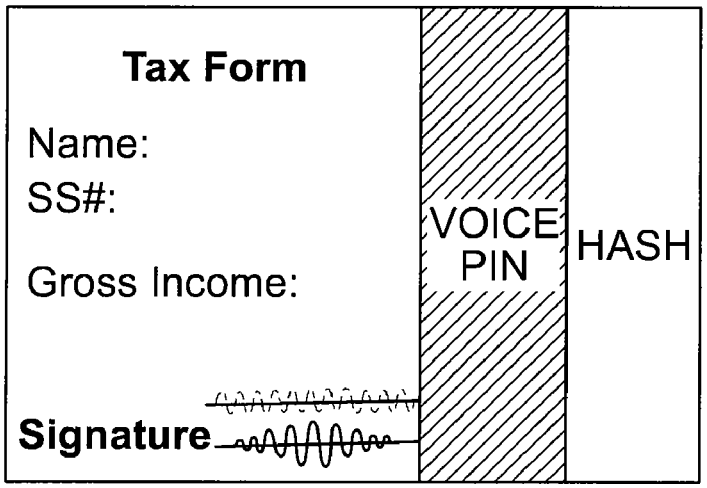
FIG. 5 is a schematic illustration showing that a hash is generated.

As illustrated in FIG. 5, a hash is generated based on the tax form, the voice signature, and the encrypted voice PIN. The hash is used to bind all of this information together. The hash thus ensures that any change to the tax form signature or voice PIN can be detected.

Figure 6:
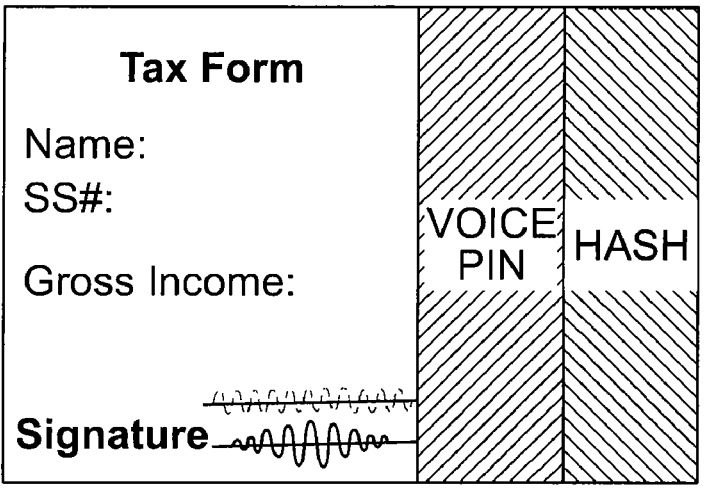
FIG. 6 is a schematic illustration showing that the hash is encrypted.

As shown in FIG. 6, this hash is then encrypted based on the unencrypted PIN (the actual PIN is used such as, for example, the digits 5678, not the utterance of the PIN recorded earlier). In order for the encryption of the hash to be suitably robust, the PIN should be of sufficient length to provide the desired level of security. Encrypting the hash with the secret PIN prevents others from modifying data and/or hash without detection. That is, this encryption is done to prevent a man-in-the-middle attack whereby someone replaces the tax form with an alternate tax form, appending the genuine voice signature and encrypted voice PIN and then tries to provide a newly calculated encrypted hash. Because the voice PIN is dictated in the signer's voice and subsequently encrypted an attacker will be unable to encrypt successfully any replacement hash with the correct key.

At this point, the tax form, associated voice signature, encrypted voice PIN and encrypted hash is sent from the taxpayer computer 12 to the IRS server 14 for filing, or to other parties if additional signatures are needed. Optionally, to facilitate data transmission and/or storage the information may be compressed before it is sent.

It is anticipated that a very small fraction of signatures will be verified by the IRS. As a practical matter, such verification is likely to arise only when the IRS is prosecuting a taxpayer for some alleged violation of the tax laws. When, however, the IRS does need to verify a signature the following steps occur. First, the IRS decrypts the voice PIN based on the IRS's private key to extract the PIN and then recalculates the hash based on the tax form, voice signature and voice PIN. The IRS then encrypts the recalculated hash based on the unencrypted voice PIN and compares it against the hash that was sent. The IRS next compares the voice of the voice signature with the voice of the voice PIN to ensure that they are the same and finally compares the voice of the voice signature with that of the taxpayer. These steps will likely entail the comparison of voiceprints made from the taxpayer's voice. The step of the IRS comparing the voice of the voice signature with the voice of the voice PIN is to prevent the possibility of a third party intercepting the package, substituting his/her own tax form and PIN, appending the taxpayer's voice signature and generating his/her own hash, encrypted with another PIN.

As those skilled in the art will appreciate, the voice signature approach disclosed herein provides the strength of a PKI-based digital signature without the client-side infrastructure costs.

It is recognized that modifications and variations of the method disclosed herein will occur to those skilled in the art and it is intended that all such modifications and variations be included within the scope of the appended claims.

What is claimed is:

1. A method for electronically signing a document, comprising:
    by a first computing device,
        electronically obtaining a public key;
        receiving a spoken personal identification number (PIN) and generating a voice PIN from the spoken PIN;
        receiving a spoken intention to execute a document and generating a voice signature from the spoken intention to execute;
        encrypting the voice PIN using the public key;
        generating a polynomial hash based on the document, the voice signature and the encrypted voice PIN, wherein the polynomial hash varies with changes in at least the voice signature and the encrypted voice PIN;
        encrypting the hash using the PIN as an input to said encryption of the hash; and
        sending the document, the voice signature, the encrypted voice PIN, and the encrypted hash to a second computing device, the second computing device being of an intended recipient of the document,
    whereby the encrypted voice PIN is provided to the second computing device to allow, by the second computing device, i) generation, using the PIN resulting from a decryption of the encrypted voice PIN, of a comparative encrypted hash of the document, the voice signature, and the encrypted voice PIN for comparison with the encrypted hash, and ii) comparison of the voice of the voice PIN to the voice of the voice signature, such that no previously stored authentication data is necessary at the location of authentication.

2. The method of claim 1, further comprising receiving, by the first computing device, a spoken signer's name for the generation of the voice signature.

3. The method of claim 1, further comprising receiving, by the first computing device, spoken temporal information for the generation of the voice signature.

4. The method of claim 3, further comprising receiving, by the first computing device, at least one of a spoken date of signing and a spoken time of signing for the generation of the voice signature.

5. The method of claim 1, further comprising receiving, by the first computing device, spoken information included in the document for the generation of the voice signature.

6. The method of claim 1, wherein the document comprises a tax form, purchase agreement, licensing agreement or commercial agreement.

7. The method of claim 1, wherein the obtaining the public key comprises obtaining the public key from software running on the first computing device.

8. The method of claim 1, wherein the obtaining the public key comprises downloading the public key from the second computing device.

9. A method for processing an electronically signed document, comprising:
- by a first computing device,
  - receiving a document, a voice signature, an encrypted voice personal identification number (PIN), and an encrypted hash from a second computing device, the second computing device being of a signer;
  - identifying an intention to execute the received document from the voice signature;
  - comparing the encrypted hash received from the second computing device to a locally encrypted hash of the document, the voice signature and the encrypted voice PIN, the locally encrypted hash encrypted by the first computing device using a PIN resulting from a decryption, by the first computing device, of the encrypted voice PIN;
  - comparing the voice of the voice PIN with the voice of the voice signature; and
  - processing the received document on the basis of (i) a match between a voice of the voice PIN and a voice of the voice signature, (ii) a match between the locally encrypted hash and the encrypted hash received by the recipient, and (iii) the identified intention to execute the received document.

10. The method of claim 9, further comprising:
- by the first computing device,
  - obtaining the voice PIN by decrypting the encrypted voice PIN using a private key;
  - obtaining the PIN from the voice PIN;
  - generating a polynomial hash based on the document, the voice signature and the encrypted voice PIN; and
  - generating the locally encrypted hash by locally encrypting the hash using the PIN.

11. The method of claim 9, further comprising:
- comparing the voice of the voice signature to the voice of the signer.

* * * * *